3,582,463
METHOD OF INHIBITING THE GROWTH OF SLIME IN PAPER MILL WATER SYSTEMS WITH DIHALOPROPIONALDEHYDES AND COMPOSITIONS THEREFOR
Arthur Schwerdle, Vineland, N.J., assignor to Vineland Chemical Company, Vineland, N.J.
No Drawing. Filed July 18, 1968, Ser. No. 745,662
Int. Cl. D21h 5/22
U.S. Cl. 162—161                    19 Claims

ABSTRACT OF THE DISCLOSURE

A method for inhibiting the formation and growth of slime in paper mill water systems involving the use of 2,3-dichloropropionaldehyde or 2,3-dibromopropionaldehyde. Preferred compositions for such use comprising, in addition to the dihalopropionaldehyde, a stabilizer such as epichlorhydrin, and/or a supplemental biocide such as 1,4-bis-bromacetoxy-2-butene or 1,4-bis-bromacetoxy-2-butyne are also provided introduced to said paper mill water system in an amount between 0.25 ounce and 1 pound per ton of paper produced.

BACKGROUND OF THE INVENTION

Slime, such as that encountered in paper mill water systems handling aqueous dispersions of papermaking fibers, is an accumulation of billions of microorganisms, especially bacteria, and occluded solids, and has a physical consistency similar to that of gelatin. The formation of appreciable amounts of slime presents many problems to the paper manufacturers. If massive clumps of slime break loose from the walls of the system and are carried into the paper, objectionable "slime spots", which are horny and glassy in appearance, are formed. Breaks in the paper at the wet end of the papermaking equipment are also caused by slime masses. Other difficulties are clogged felts, wires and screens and decreased pulp freeness. Since modern paper mills, operating at high rates of speed and to more rigid specifications, cannot tolerate slow-downs and malfunctioning of equipment due to slime accumulation, slime inhibition or control has become an accepted and required aspect of papermaking technology.

Bacteria as such are not harmful in a paper mill water system, but become so upon proliferation and agglutination. Slime control, i.e. inhibiting the formation and growth of slime, therefore, may be said to be effected by impairment of a vital function of slime-forming organisms, namely reproduction.

There is no absolute correlation between bacteria count and the presence of slime in a paper mill water system. Thus, a paper mill may have many organisms introduced into the circulating water system and no slime will form because the system lacks the proper conditions, such as adequate food, water temperature, degree of aeration, pH, and the like, which permit slime-forming bacteria to multiply. However, experience has shown that reduction in bacteria count is closely related to the prevention and growth of slime; it is reasonable to expect that a reduction in bacteria count will likewise result in inhibiting the formation of slime composed of the same organisms. Bacteria count is, therefore, useful in establishing the effectiveness of a biocide in a paper mill water system.

Slime control alone is not the sole criterion in determining whether or not a material is a satisfactory practical slime control agent. Factors such as relative cost, amount required, frequency of addition, effect on the paper and equipment, effect on workers, and the like, are also to be considered.

A number of materials have been suggested and used as slime controllants. Chlorine has been widely used, either alone or in combination with ammonia to form chloramine, but chlorine does not persist in the system for long periods of time and may cause corrosion. Phenylmercury salts, also widely used, present at least a psychological hazard to the paper manufacturer because of the possibility of mercury, a strong poison, being present in the paper. Phenylmercuric acetate, although an extremely effective germicide, is deactivated in the presence of organic matter. Chlorinated phenols have an offensive odor and taste which is imparted to the water and to the paper. Quaternary ammonium compounds, although excellent germicides, are substantive to paper fiber and are rapidly depleted from the system. Compounds of sulfur are decomposed rapidly in the paper mill water system into odorous compounds having no slime control efficacy. Compounds of arsenic suffer from the same disadvantage as mercurials, namely toxicity.

Acrolein has been widely used as a slime control agent (see, for example, Pat. No. 3,250,667); however, this material is a powerful lachrymator.

One of the oustanding slime control agents in use today is 1,4-bis-bromacetoxy-2-butene (see, for example, Pat. No. 2,873,249). The closely related 1,4-bis-bromacetoxy-2-butyne is also being used.

The search continues for even more effective slime control agents.

It is the principal object of the present invention to provide an improved method for inhibiting the formation and growth of slime in a paper mill water system.

Another principal object of the present invention is to provide novel compositions adapted for use in the improved method for controlling slime in paper mill water systems.

A specific object is to provide a method, and compositions for use therein, for controlling slime which is even more effective than the aforementioned 1,4-bis-bromacetoxy-2-butene.

These and other objects will become apparent from a consideration of the following specification and claims.

SUMMARY OF THE INVENTION

It has been found that 2,3 - dichloropropionaldehyde and 2,3-dibromopropionaldehyde, and especially the latter, are excellent agents for controlling slime in paper mill water systems. Hence, the invention in its broader aspects is, in the method of inhibiting the formation and growth of slime in a paper mill water system wherein a slime control agent is introduced to the system, the improvement wherein said slime control agent comprises at least one dihalopropionaldehyde selected from the group consisting of 2,3-dichloropropionaldehyde and 2,3-dibromopropionaldehyde.

It has been found that 2,3-dibromopropionaldehyde is on the order of 4–5 times as effective as 1,4-bis-bromacetoxy-2-butene, and that 2,3-dichloropropionaldehyde is about 80% as effective as theh 2,3-dibromopropionaldehyde.

The stated dihalopropionaldehydes are known compounds, being prepared, for example, by halogenation of acrolein. These compounds have been suggested for use on fresh fruits and vegetables to suppress the development of mold and decay (Pat. No. 2,665,217) and the dichloro compound was one of many compounds tested and found effective in preventing mold growth in hay (Schenk et al., Agronomy Journal, vol. 47, pp. 64–69 (1955)).

In carrying out the method of this invention, the dihalopropionaldehyde may be added to a paper mill water system to inhibit the formation and growth of slime in various ways depending upon the requirements of the particular system. Slime formation and growth depend not only upon the presence of slime-forming bacteria but also on the presence of conditions within the water system which promote bacteria reproduction. Such factors as the presence of foodstuff for the bacteria, water temperature, degree of aeration and pH, which affect bacteria reproduction, vary from time to time and from point to point in a particular water system. Likewise, different mill systems will have different slime problems. For these reasons, the particular manner in which the method is carried out will be subject to variations as regards quantity of slime control agent added, frequency of addition, point of addition, and the like, as will occur to the particular paper manufacturer. The slime control agent may be added at the site or sites of greatest slime accumulation, which is generally at or about the papermaking machine. It may be added at the fan pump or the distributing trough or at any point before the machine where good mixing will occur.

The dihalopropionaldehyde has been found to be effective in high dilution, and hence only a small but effective amount need be used. Papermaking machines are shut down periodically for repair, replacement of parts, etc., during which the machine may be cleaned. Hence, the present method may be carried out so as to permit some minor but controlled slime formation which does not interfere materially with machine operation or quality of the paper product. Slime affixed to walls of the system may also be made to retrogress by the use of greater quantities of the slime controllant at such points and times than are otherwise needed to control slime in the entire system. The slime controllant may be added as a slug periodically only when a bacteria count indicates the need for treatment or it may be added in a continuous controlled manner. Because of such variations in the amount of slime controllant that may be present from point to point and from time to time in a particular system, it has been customary to relate the amount of slime control agent used to the quantity of paper produced. Thus, in accordance with the present invention, the dihalopropionaldehyde will generally be introduced to the system in an amount between about 0.25 ounce and about 1 pound, and most usually between about 2 and about 8 ounce, per ton of paper produced.

The dihalopropionaldehydes, upon standing, gradually darken eventually to a black color and thicken. Since this may be encountered in storage, at the place of manufacture, in transit or at the paper mill, it is recommended that a stabilizing agent be included. The preferred stabilizing agents are epichlorhydrin and epibromhydrin in an amount from about 1 to about 10%, by weight, based on the weight of the dihalopropionaldehyde.

The dihalopropionaldehyde need not be the sole slime control agent employed, and it may be used in conjunction with another slime control agent or agents. Examples of other slime control agents that may be used are 1,4-bis-bromacetoxy-2-butene; 1,4-bis-bromacetoxy-2-butyne; 5-dibromoacetoxymethyl dioxane-1,3; 2-oxo-5-dibromoacetoxymethyl dioxane-1,3; hydroxy phenylbromacetophenone; aryl bromacetates, and the like.

In this connection, mixtures of the dihalopropionaldehydes with 1,4-bis-bromacetoxy-2-butene and with 1,4-bis-bromacetoxy-2-butyne have been found to provide unexpected synergistic results as illustrated in examples set forth hereinafter. Thus, in accordance with a preferred embodiment of the invention there are provided and used such mixtures in which the dihalopropionaldehyde is present in an amount from about 10 to about 90%, preferably from about 30 to about 50%, by weight, based on the combined weight of the dihalopropionaldehyde and the bis-bromacetoxy compound.

The invention will be more readily understood from a consideration of the following specific examples and data which are given for the purpose of illustration only and are not to be considered as limiting the scope of the invention in any way.

EXAMPLE 1

Acrolein, containing 10%, by weight, of epichlorhydrin, is brominated by adding bromine dropwise, while maintaining the temperature at about 25–35° C., until a cherry red color appears indicating completion of the reaction and excess bromine. Styrene is then added, as a bromine scavenger, in an amount to remove the color.

The material is stored at 50° C. for nineteen days, and samples are tested biologically on the first, fifth, seventh and nineteenth days. In testing, aliquot portions of the technical material are placed in sterile water to provide solutions containing various concentrations of about 80% pure dibromopropionaldehyde. The same is done with technical 1,4-bis-bromacetoxy-2-butene (about 80% pure). To each sample is added 1 cc. of *Aerobacter aerogenes* broth culture. After standing for four hours at 25° C., one cc. of each sample is placed in sterile agar in a sterile petri dish and incubated at 37° C. for 24 hours.

The relative effectiveness of the technical dibromopropionaldehyde on the various days compared to the 1,4-bis-bromacetoxy-2-butene is set forth below wherein the figures refer to the number of parts by weight of technical 1,4-bis-bromacetoxy-2-butene to which 1 part by weight of technical dibromopropionaldehyde is equivalent in effectiveness against the stated bacteria:

| Days at 50° C.: | Related effectiveness |
| --- | --- |
| 0 (no storage) | 4.3 |
| 5 | 4.0 |
| 7 | 3.5 |
| 19 | 3.2 |

It was found that, with the fresh material, a concentration of the technical dibromopropionaldehyde of about 40 p.p.m. is required to give clear plates; that is, completely inhibit the growth of the bacteria. It requires 150–200 p.p.m. of 1,4-bis-bromacetoxy-2-butene to give clear plates.

Comparable results have been obtained on storage at 50° C. when epibromhydrin was substituted for the epichlorhydrin.

EXAMPLE 2

Example 1 is repeated using technical dichloropropionaldehyde prepared by bubbling chlorine into acrolein containing 10%, by weight, of epichlorohydrin. This material appears to be slightly more stable but not quite as strong as the dibromo compound in that about 50 p.p.m. is required to give clear plates. Thus, the dichloro compound appears to be about 80% as effective as the dibromo compound.

EXAMPLE 3

The procedure of Example 1 is followed except that technical 1,4-bis-bromacetoxy-2-butene is added to the technical dibromopropionaldehyde to form a mixture of 60 parts of the former to 40 parts of the latter. The relative effectiveness of the mixture on the various days, as compared to 1,4-bis-bromacetoxy-2-butene alone (parts of 1,4-bis-bromacetoxy-2-butene equivalent to 1 part of 60/40 mixture above), is set forth below:

| Days at 50° C.: | Relative effectiveness |
| --- | --- |
| 0 | 3.6 |
| 5 | 2.0 |
| 7 | 1.7 |
| 19 | 1.7 |

EXAMPLES 4–9

Mixtures of technical 1,4-bis-bromacetoxy-2-butene (referred to as "BBB") and technical dibromopropionaldehyde containing 10% epichlorhydrin (referred to below as "DBP") are prepared with weight ratios of the former to the latter of 80:20; 60:40; 50:50; 40:60 and 20:80. These are tested biologically as in Example 1 and compared to 1,4-bis-bromacetoxy-2-butene alone, with the following results:

| Example | Ratio BBB:DBP in mix | P.p.m. of mix (○) | P.p.m. BBB | Parts BBB replaced by 1 part DBP | Synergism factor [1] |
|---|---|---|---|---|---|
| 4 | 80:20 | 30 | 80 | 9.3 | 1.6 |
|   |       | 40 | 100 | 8.5 | 1.7 |
|   |       | 50 | 140 | 10.0 | 1.7 |
| 5 | 60:40 | 25 | 80 | 6.5 | 1.4 |
|   |       | 30 | 200 | 14.2 | 2.9 |
|   |       | 35 | 225 | 13.9 | 2.8 |
| 6 | 50:50 | 40 | 160 | 7.0 | 1.5 |
|   |       | 50 | 225 | 8.0 | 1.6 |
| 7 | 40:60 | 20 | 80 | 6.0 | 1.3 |
|   |       | 25 | 200 | 12.7 | 2.7 |
|   |       | 30 | 225 | 11.8 | 2.5 |
| 8 | 20:80 | 15 | 80 | 6.4 | 1.4 |
|   |       | 20 | 110 | 9.6 | 1.5 |
|   |       | 25 | 175 | 8.5 | 1.9 |
| 9 | 0:100 | 20 | 70 | [2] 3.5 | |
|   |       | 30 | 120 | [2] 4.0 | |
|   |       | 40 | 220 | [2] 5.5 | |

[1] For example, considering a 60:40 mixture of BBB:DBP at 30 p.p.m., the mixture contains 30×0.6=18 p.p.m. BBB and 30×0.4=12 p.p.m. DBP. Since 1 part of DBP is about as effective as 4.3 parts of BBB, 12 p.p.m. DBP is equivalent to 12×4.3=52 p.p.m. BBB and, therefore, the 60:40 mixture theoretically should be equivalent to 52+18=70 p.p.m. of BBB. But this mixture at 30 p.p.m. is as effective as 200 p.p.m. of BBB. Therefore, the Synergism Factor for this mix at 30 p.p.m. is 200/70=2.9.
[2] Average is about 4.3.

A 60:40 mixture of technical 1,4-bis-bromacetoxy-2-butyne and technical 2,3-dibromopropionaldehyde is about 2.3 times as effective as the same amount of technical 1,4-bis-bromoacetoxy-2-butene.

EXAMPLES 10–13

Five species of bacteria are exposed to four different biocides: (1) DBP; (2) 60 BBB:40 DBP; (3) dichloropropionaldehyde (DCP) and (4) 60 BBB:40 DCP in a constant temperature bath at 25° C. for four hours, and the effectiveness of each is compared to that of BBB alone in sterile agar. Each biocide is rated against each species of bacteria as set forth in the following table. If the growth in the plates containing BBB alone at 150 p.p.m. matches the growth in the plates of the particular biocide at 75 p.p.m. then that biocide is given a rating of 2. The ratings given are averages of individual ratings at various concentrations at which dilutions are made. The data are summarized as follows:

| Bacteria | Ratings for named biocide compared to BBB | | | |
|---|---|---|---|---|
|  | DBP | 60 BBB: 40 DBP | DCP | 60 BBB: 40 DCP |
| Aerobacter aerogenes | 4.3 | 3.6 | 3.3 | 1.3 |
| Bacillus mycoides | [1] Clear | [1] Clear | [1] Clear | [1] Clear |
| Bacillus subtilis | 2.0 | 2.5 | (²) | 1.5 |
| Escherichia coli | 6.7 | 2.0 | (²) | (³) |
| Pseudomonos | 3.5 | 2.5 | (²) | (³) |

[1] Minimum concentration was too high.
[2] Overgrown at 60 p.p.m.
[3] Overgrown at 50 p.p.m. Maximum concentration set forth is too low

EXAMPLES 14–16

Tests run on a commercial cylinder type paper-making machine further illustrate the effectiveness of dibromopropionaldehyde. The machine has seven cylinders (cylinder #7 running with fresh water, bleached pulp and no biocide) and samples of the furnish and of the white water from each of cylinders 1–6 are taken and tested for bacterial count after incubation at 95° F. for 48 hours.

(14) Samples taken after the mill had been operating for several days using BBB at the rate of about 2–3 oz. per ton of paper, introduced to the screen before the cylinder vat, showed the following bacteria count:

| Cylinder No. | Bacteria count (thousands per cc.) |
|---|---|
| Sample from—: | |
| Furnish | |
| 1 | 150 |
| 2 | 850 |
| 3 | 220 |
| 4 | 400 |
| 5 | 400 |
| 6 | 680 |
| White water | |
| 1 | 72 |
| 2 | 1,250 |
| 3 | 710 |
| 4 | 780 |
| 5 | 480 |
| 6 | 300 |
|  | [1] 523 |

[1] Average.

(15) Samples taken after the mill had been operating for a total of 3, 7, 12 and 19 days using a mixture of 60 BBB:40 DBP (the DBP containing 10% epichlorhydrin) at the same rate as the BBB in Example 14 (this test commenced following a routine mill "wash down") showed the following bacteria count:

| Cylinder No. | Bacteria count (in thousands per cc.) after elapsed number of days— | | | |
|---|---|---|---|---|
|  | 3 | 7 | 12 | 19 |
| Sample from—: | | | | |
| Furnish | | | | |
| 1 | 16 | 7 | 19 | 35 |
| 2 | 189 | 22 | 9 | 28 |
| 3 | 194 | 32 | 10 | 32 |
| 4 | 264 | 44 | 20 | 40 |
| 5 | 223 | 26 | 13 | 51 |
| 6 | 132 | 31 | 14 | 102 |
| White water | | | | |
| 1 | 20 | 74 | 10 | 28 |
| 2 | 161 | 155 | 16 | 17 |
| 3 | 56 | 56 | 20 | 24 |
| 4 | 12 | 93 | 13 | 51 |
| 5 | 48 | 31 | 15 | 46 |
| 6 | 30 | 55 | 15 | 38 |
|  | [1] 112 | [1] 52 | [1] 15 | [1] 41 |

[1] Average.

(16) Samples taken after the mill had been operating for a total of 2, 8 and 15 days using the same mixture as in Example 15 but at only 75% of the rate used in Example 15 (this test commenced following a routine mill "wash down") showed the following bacteria count:

| Cylinder No. | Bacteria count (in thousands per cc.) after elapsed number of days— | | |
|---|---|---|---|
|  | 2 | 8 | 15 |
| Sample from—: | | | |
| Furnish | | | |
| 1 | 85 | 156 | 218 |
| 2 | 171 | 6 | 131 |
| 3 | 240 | 10 | 250 |
| 4 | 74 | 2 | 135 |
| 5 | 420 | 1 | 100 |
| 6 | 110 | 1 | 175 |
| White water | | | |
| 1 | 25 | 75 | 182 |
| 2 | 36 | 6 | 375 |
| 3 | 42 | 3 | 260 |
| 4 | 83 | 10 | 57 |
| 5 | 124 | 1 | 60 |
| 6 | 87 | 1 | 120 |
|  | [1] 125 | [1] 23 | [1] 172 |

[1] Average.

Modification is possible in the selection of materials and amounts thereof as well as in the particular techniques employed without departing from the scope of the invention.

What is claimed is:

1. In the method of inhibiting the formation and growth of slime in a paper mill water system wherein a slime control agent is introduced to the system, the improvement wherein said slime control agent comprises at least one dihalopropionaldehyde selected from the group consisting of 2,3-dichloropropionaldehyde and 2,3-dibromopropionaldehyde introduced to said paper mill water system in an amount between about 0.25 ounce and about 1 pound per ton of paper produced.

2. The method of claim 1 wherein the amount of said dihalopropionaldehyde introduced is from about 2 to about 8 ounces per ton of paper produced.

3. In the method of treating a paper mill water system comprising an aqueous dispersion of papermaking fibers wherein a slime control agent is introduced to the system containing said fibers in a small effective amount to inhibit the formation and growth of slime, the improvement wherein said slime control agent comprises at least one dihalopropionaldehyde selected from the group consisting of 2,3 - dichloropropionaldehyde and 2,3 - dibromopropionaldehyde and is introduced to said paper mill water system in an amount between about 0.25 ounces and about 1 pound per ton of paper produced.

4. The method of claim 1 wherein a supplemental slime control agent is introduced to said system in addition to said dihalopropionaldehyde.

5. The method of claim 4 wherein said supplemental slime control agent is 1,4-bis-bromacetoxy-2-butene.

6. The method of claim 4 wherein said supplemental slime control agent is 1,4-bis-bromacetoxy-2-butyne.

7. The method of claim 1 wherein said dihalopropionaldehyde contains from about 1 to about 10% of an epihalohydrin selected from the group consisting of epichlorhydrin and epibromhydrin.

8. The method of claim 4 wherein said dihalopropionaldehyde contains from about 1 to about 10% of an epihalohydrin selected from the group consisting of epichlorhydrin and epibromhydrin.

9. A biocidal composition comprising (1) at least one dihalopropionaldehyde selected from the group consisting of 2,3-dichloropropionaldehyde and 2,3-dibromopropionaldehyde and (2) a bis-bromacetoxy compound selected from the group consisting of 1,4-bis-bromacetoxy-2-butene and 1,4-bis-bromacetoxy-2-butyne, said dihalopropionaldehyde being in an amount of from about 10 to about 90%, by weight, based on the combined weight of said dihalopropionaldehyde and said bis-bromacetoxy compound.

10. The composition of claim 9 wherein said dihalopropionaldehyde is present in an amount ranging from about 20 to about 80%, by weight, based on the combined weight of said dihalopropionaldehyde and said bis-bromacetoxy compound.

11. The composition of claim 10 wherein said dihalopropionaldehyde is present in an amount ranging from about 30 to about 50%.

12. The composition of claim 9 wherein said dihalopropionaldehyde comprises 2,3-dibromopropionaldehyde and wherein said bis-bromacetoxy compound comprises 1,4-bis-bromacetoxy-2-butene.

13. The composition of claim 9 containing also an epihalohydrin selected from the group consisting of epichlorhydrin and epibromhydrin in a stabilizing amount of from about 1 to about 10%, by weight, based on the combined weight of said epihalohydrin and said dihalopropionaldehyde.

14. The composition of claim 13 wherein said dihalopropionaldehyde is present in an amount ranging from about 20 to about 80% by weight, based on the combined weight of said dihalopropionaldehyde and said bis-bromacetoxy compound.

15. The composition of claim 13 wherein said dihalopropionaldehyde is 2,3-dibromopropionaldehyde.

16. The composition of claim 15 wherein said bromacetoxy compound is 1,4-bis-bromacetoxy-2-butene.

17. The composition of claim 16 wherein said epihalohydrin is epichlorhydrin.

18. The method of claim 5 wherein said dihalopropionaldehyde is in an amount of from about 10 to about 90%, by weight, based on the combined weight of said dihalopropionaldehyde and said 1,4-bis-bromacetoxy-2-butene.

19. The method of claim 6 wherein said dihalopropionaldehyde is in an amount of from about 10 to about 90%, by weight, based on the combined weight of said dihalopropionaldehyde and said 1,4-bis-bromacetoxy-2-butyne.

References Cited

UNITED STATES PATENTS

| | | | |
|---|---|---|---|
| 2,665,217 | 1/1954 | Meuli | 424—333 |
| 2,873,249 | 2/1959 | Schwartz | 162—161 |
| 3,006,807 | 10/1961 | Legator | 162—161 |
| 3,260,760 | 7/1966 | Domen | 260—652.5 |
| 3,485,638 | 12/1969 | Benson | 162—161 |

OTHER REFERENCES

Pulp & Paper Manufacture, vol. 4, 1st edition, McGraw-Hill, 1955, p. 601.

S. LEON BASHORE, Primary Examiner

R. H. ANDERSON, Assistant Examiner

U.S. Cl. X.R.

260—652.5; 424—333

UNITED STATES PATENT OFFICE
CERTIFICATE OF CORRECTION

Patent No. 3,582,463          Dated June 1, 1971

Inventor(s) Arthur Schwerdle

It is certified that error appears in the above-identified patent and that said Letters Patent are hereby corrected as shown below:

The Abstract of the Disclosure should be corrected to reflect that that portion of the last sentence beginning with the word "introduced" should be a part of the first sentence of the Abstract following the word "2,3-dibromopropionaldehyde".

Column 5, line 35, "butene" should read --- butyne ---.

Column 6, line 10, "220" should read --- 200 ---.

Signed and sealed this 28th day of December 1971.

(SEAL)
Attest:

EDWARD M. FLETCHER, JR.
Attesting Officer

ROBERT GOTTSCHALK
Acting Commissioner of Patents